3,089,855
OXYGEN LIBERATING COMPOSITION

Robert M. Bovard, Callery, Pa., assignor to MSA Research Corporation, Pittsburgh, Pa., a corporation of Pennsylvania
No Drawing. Filed Aug. 6, 1959, Ser. No. 831,943
3 Claims. (Cl. 252—186)

This invention relates to compositions and devices for producing oxygen, and more particularly it relates to those of the well known chlorate candle type.

A source of oxygen for respiration is required for a variety of purposes such, for example, as in high altitude aircraft, for breathing apparatus for use in non-respirable atmospheres, in mountain climbing, to avoid oxygen depletion in closed chambers occupied by persons, and for related purposes such as readily portable sources of oxygen for emergency use, as in hospitals or for resuscitation in the field, to provide oxygen for welding torches, and for various other uses. Cylinders containing oxygen under pressure are in general unsuited for the foregoing and other purposes because the cylinders are objectionably heavy and bulky, or if small enough to be carried easily the supply of oxygen is limited.

For such and related purposes the so called chlorate candles have been used extensively for a considerable number of years. Conventionally, the primary oxygen source of those candles are chlorates or perchlorates with which there is associated an oxide, commonly barium peroxide, to fix chlorine that is liberated in combustion of the candle, and a metallic powder to provide a source of heat for the thermal decomposition of the chlorate or perchlorate. Such compositions mixed with a binder are consolidated. Thus, chlorate candles have been made from sodium chlorate, hydrogen reduced iron powder, barium peroxide and fiber glass or asbestos fibers as a binder. Such fibers tend to cause the production of more chlorine than the barium peroxide can fix in the amounts conventionally used, and experience has shown that higher percentages of the peroxide not only will not remove the chlorine but actually tend to produce a condition that forms more chlorine as well as to increase the burning rate of the candle undesirably.

In the production of chlorate oxygen candles one practice has been to mix the materials with water, press the composition into a mold, and dry the pressed candle. Another practice has been to melt the sodium chlorate, disperse the other materials uniformly through the melt, and cast the resultant suspension into a mold. Representative compositions of the type with which the invention is concerned are disclosed in Patents No. 2,558,756 to C. B. Jackson et al. and No. 2,469,414 to W. H. Schechter.

These consolidated candles, whether pressed or cast, are disposed in a closed canister provided with an oxygen outlet and with means of various types for igniting the candle. These devices may take various forms examples of which appear in Hloch Patent No. 2,115,142, Bovard et al. Patent No. 2,764,475, and the aforesaid Jackson et al. patent.

In the use of these devices over the years experience has shown that the combustion products may, and frequently do, contain an amount of chlorine such as to be objectionable where the oxygen is required for breathing purposes. In fact, the chlorine content may occasionally reach as high as 20 p.p.m., an amount intolerable for respiration. Attempts to find binders that do not cause the production of chlorine have been unsuccessful, as far as I am aware, prior to this invention.

A composition typical of prior practices contains, by weight, from 80 to 84 percent of sodium chlorate, 4 percent of barium peroxide, 6 to 8 percent of hydrogen reduced iron powder, and 6 to 8 percent of glass fibers or fibrous asbestos.

It is among the objects of this invention to provide oxygen generating compositions in the use of which the formation of chlorine is suppressed, and may even be eliminated; that may be produced in accordance with existing practices by a slight modification of the known constituents; that embody a novel binder that acts also as a heat source; that are of controllable burning time; and that are capable of liberating greater amounts of oxygen for a given size of candle.

The invention is predicated upon my discovery that its objects are attained by the use of short lengths of steel wool as a binder in conventional chlorate candle compositions comprising an alkali metal chlorate and barium peroxide. I have found that such steel wool fibers not only act as a satisfactory binder, but, more importantly, the presence of chlorine in the liberated gas is either prevented or it appears in amounts at most in the order of 1 p.p.m. Moreover, the steel wool acts as a heat source so that for some purposes the metal powder, such as hydrogen reduced iron, that has been necessary heretofore may be dispensed with, or at least used in lesser amount. If the steel wool undergoes more than surface exodation, the strength of the candle is not affected deleteriously.

For most purposes the steel wool should be cut to short lengths, or clippings. The diameter of the wool fibers and the lengths may be varied according to desired burning rate. I have found that, for example, commercial steel wool cut to $1/16$ inch to $3/8$ inch length clippings gives satisfactory results in the practice of the invention, for instance in a composition containing 80 to 89 percent sodium chlorate, 4 to 7 percent of such steel wool, 4 percent of barium peroxide, and 0 to 4 percent of hydrogen reduced iron powder. Such compositions give a satisfactory burning rate and produce approximately 10 percent more oxygen than a candle of the same size made from the foregoing conventional compositions without steel wool. Clippings, or cuttings longer than $3/8$ inch are hard to distribute uniformly through the candle mix. For most purposes the steel wool is desirably from 0.002 inch to 0.01 inch diameter.

In general these compositions contain a preponderant amount of chlorate, say 70 to 90 percent by weight with the other ingredients in minor proportions making up the remainder. Sodium chlorate is preferred for most purposes although other alkali metal chlorates might be used. Thus lithium chlorate while advantageous from the standpoint of weight may be unsuited for some purposes because of its deliquescence. Potassium chlorate is objectionably heavy, and both it and the lithium compound are more expensive than sodium chlorate.

The compositions according to the invention may be formed, or shaped, in accordance with existing practices, such as those alluded above. Similarly, these candles may be used with any device of the type intended for such purposes, such as those of the patents noted above.

In accordance with the provisions of the patent statutes I have explained the principle of my invention and have described what I now consider to represent its best embodiment. However, I desire to have it understood that, within the scope of the appended claims, the invention may be practiced otherwise than as specifically described.

I claim:

1. An oxygen liberating composition which upon burning liberates oxygen consisting essentially of a consolidated body having substantially uniformly distributed therethrough, by weight, about 4 to 7 percent of steel wool, 2 to 6 percent of barium peroxide, 0 to 4 percent of iron powder, and the remainder substantially all alkali metal chlorate.

2. An oxygen liberating composition according to claim 1, said chlorate being sodium chlorate.

3. An oxygen liberating composition according to claim 1, said chlorate being sodium chlorate, and said body being in cast form.

References Cited in the file of this patent
UNITED STATES PATENTS

| | | |
|---|---|---|
| 2,121,347 | Hausmann | June 21, 1938 |
| 2,170,052 | Heim | Aug. 22, 1939 |
| 2,221,520 | Kessel | Nov. 12, 1940 |
| 2,245,495 | Pemble | June 10, 1941 |
| 2,558,756 | Jackson et al. | July 3, 1951 |

UNITED STATES PATENT OFFICE
CERTIFICATE OF CORRECTION

Patent No. 3,089,855 May 14, 1963

Robert M. Bovard

It is hereby certified that error appears in the above numbered patent requiring correction and that the said Letters Patent should read as corrected below.

Column 1, line 57, for "Patent No. 2,115,142" read -- Patent No. 2,114,142 --.

Signed and sealed this 19th day of November 1963.

(SEAL)
Attest:

ERNEST W. SWIDER

Attesting Officer

EDWIN L. REYNOLDS

Acting Commissioner of Patents